US00RE42026E

(19) United States
(12) Reissued Patent
Levine

(10) Patent Number: US RE42,026 E
(45) Date of Reissued Patent: Jan. 11, 2011

(54) TELEVISION SYSTEM MODULE WITH REMOTE CONTROL CODE DETERMINATION

(75) Inventor: Michael R. Levine, Boca Raton, FL (US)

(73) Assignee: Index Systems, Inc., Tortola (VG)

(21) Appl. No.: 08/710,645

(22) Filed: Sep. 18, 1996

Related U.S. Patent Documents

Reissue of:
(64) Patent No.: 5,365,282
Issued: Nov. 15, 1994
Appl. No.: 08/005,727
Filed: Jan. 19, 1993

(51) Int. Cl.
*H04N 5/44* (2006.01)
*H04N 7/176* (2006.01)
*H04N 5/76;* (2006.01)

(52) U.S. Cl. ..... 725/132; 725/140; 725/152; 348/734; 340/825.69; 340/7.39; 340/7.4; 340/5.61; 386/83

(58) Field of Classification Search ..... 725/132, 725/140, 152, 100, 131, 134, 142, 18, 139; 348/552, 725, 731, 734, 6, 10, 12, 460, 553; 358/194.1, 139, 339, 335; 340/825.69, 825.75, 340/7.39, 7.4, 10.34, 5.61; 381/110; 359/142; 445/4.1, 6.1, 186.1, 352; 386/83, 46
See application file for complete search history.

(56) References Cited

U.S. PATENT DOCUMENTS 4,509,211 A 4/1985 Robbins ..... 455/603
4,703,350 A 10/1987 Rumbolt et al. ..... 358/194.1
4,712,105 A * 12/1987 Kohler ..... 340/825.69
4,802,114 A 1/1989 Sogame ..... 364/900
4,908,713 A 3/1990 Levine ..... 358/335
4,963,994 A 10/1990 Levine ..... 358/335
4,999,622 A * 3/1991 Amano et al. ..... 340/825.72
5,065,235 A 11/1991 Iijima ..... 358/86
5,081,534 A * 1/1992 Geiger et al. ..... 348/734
5,123,046 A 6/1992 Levine ..... 380/10
5,297,204 A * 3/1994 Levine ..... 380/10
5,303,063 A * 4/1994 Kim et al. ..... 386/93
5,448,370 A * 9/1995 Kim et al. ..... 348/734
5,455,636 A * 10/1995 Furrey et al. ..... 348/731
5,473,317 A * 12/1995 Inomata et al. ..... 340/825.25
5,581,800 A * 12/1996 Fardeau et al. ..... 455/2.01
5,640,262 A * 6/1997 Hanai et al. ..... 398/214
5,691,710 A * 11/1997 Pietraszak et al. ..... 340/825.72
5,872,562 A * 2/1999 McConnell et al. ..... 345/169
5,991,498 A * 11/1999 Young ..... 386/83
6,049,653 A * 4/2000 Furrey et al. ..... 386/83

OTHER PUBLICATIONS

Radio Shack Owner's Manual for Universal Remote Control, Realistic Cat No. 15–1901.

* cited by examiner

*Primary Examiner*—Christopher Kelley
*Assistant Examiner*—Reuben M. Brown
(74) *Attorney, Agent, or Firm*—Ropes & Gray LLP

(57) ABSTRACT

A video recorder, adapted for use in conjunction with a remotely controllable unit associated with television recording and/or viewing, contains a remote-control signal transmitter to transmit control codes to the associated unit, and means to analyze the operation of the associated unit in response to the control codes. An electronic controller causes the transmitter to transmit test codes to the associated unit, then analyzes the resulting operation of the associated unit to determine its control codes, which it stores in a memory for later use.

5 Claims, 3 Drawing Sheets

TELEVISION SYSTEM MODULE WITH REMOTE CONTROL CODE DETERMINATION

Matter enclosed in heavy brackets [ ] appears in the original patent but forms no part of this reissue specification; matter printed in italics indicates the additions made by reissue.

FIELD OF THE INVENTION

This invention relates generally to television viewing systems employing modules such as VCR's, cable boxes or the like, which are remotely controllable, and more particularly to modules incorporating transmitters for remotely controlling associated modules, and having the capability of automatically determining the remote control codes of the associated modules.

BACKGROUND OF THE INVENTION

A typical consumer-oriented television viewing and recording system may include several modular units in addition to a television receiver or monitor. A video recorder (VCR) is commonly used for the recording of broadcast programming and the playback of pre-recorded cassettes. When the broadcasts are received over a cable system, a separate cable tuner/descrambler or "cable box" is commonly employed to decipher premium or "pay" channels. Other associated units may further be included, such as a receiver to tune and descramble programs broadcast via satellite.

These units typically incorporate an infrared receiver which allows the operator, through use of a hand-held transmitter, to turn the unit on and off, control the channel setting of the units' tuner, etc. My U.S. Pat. No. 5,123,046 discloses a VCR with a built-in transmitter for sending remote control codes to an associated unit such as a cable box. This allows the future, unattended recording system of the VCR to energize the cable box and properly set its tuner at the time of a programmed recording. It also allows the control of both units from a single remote transmitter since the VCR can relay control commands to the cable box. The same type of control can be exercised over a remotely controllable T.V. receiver. Alternatively, either the cable box or the T.V. receiver could incorporate the transmitter and the VCR could act as a "slave."

At the present time there is no industry standard for remote control codes so it is necessary for the operator of a multi-unit system of a master and one or more slave units to perform an initializing routine of the same type required with so-called "universal" remote control transmitters. This routine allows the transmitter to determine the control codes for the slave units and store the codes in a memory for future use. These initialization routines are difficult for the average consumer to perform unless they carefully follow the instructions which accompany the unit.

In view of these problems, there is a need for a T.V.-related piece of equipment which can serve as a central receiver of operator commands, and control associated units accordingly. To ease installation, such a device should be able to "learn" the control codes of an associated unit to facilitate VCR and T.V. set control in accordance with operator recording/viewing requests.

SUMMARY OF THE INVENTION

The present invention is directed toward a modular unit adapted for use in conjunction with one or more remotely controllable units associated with television recording and/or viewing. In a preferred embodiment of the invention, which will subsequently be disclosed in detail, the "master" modular unit constitutes a video recorder and the following description will refer to a video recorder with the understanding that another unit, such as the cable box, could act as the master. The video recorder "master" contains a remote-control signal transmitter to transmit control codes to one or more associated "slave" units, and means to analyze the operation of the associated units in response to the control codes. During an initialization routine, an electronic controller causes the master transmitter to send test codes to the associated unit, then analyzes the resulting operation of the associated unit to determine its control codes, which it stores in a memory for later use in control of the associated unit.

In a preferred embodiment of the invention, the associated unit contains a multi-channel tuner, and the video recorder is adapted to receive and analyze the R.F. output signal from the tuner to determine its operation in response to the test control codes. When the associated unit is a cable tuner/descrambler, the video recorder derives a video signal from the R.F. output of the tuner/descrambler and analyzes the synchronization of the video signal to identify the tuned channel. When the associated unit is a television receiver, the video recorder is adapted to receive and analyze an acoustic signal generated by the T.V.

Before the video recorder can analyze the control codes of associated units it must make a determination as to whether it is receiving a signal source from an auxiliary unit which provides output on only a single channel or if it is connected directly to a multi-channel signal source such as a cable. The preferred embodiment to the invention includes means for automatically analyzing the nature of its input signal to make this determination as the first operation in its initialization routine.

Other objects and advantages of the present invention will be made clear by the following detailed description of a preferred embodiment to the invention and an alternative embodiment. The description makes reference to the accompanying drawings in which:

DETAILED DESCRIPTION OF THE PREFERRED EMBODIMENT

Figure 1:
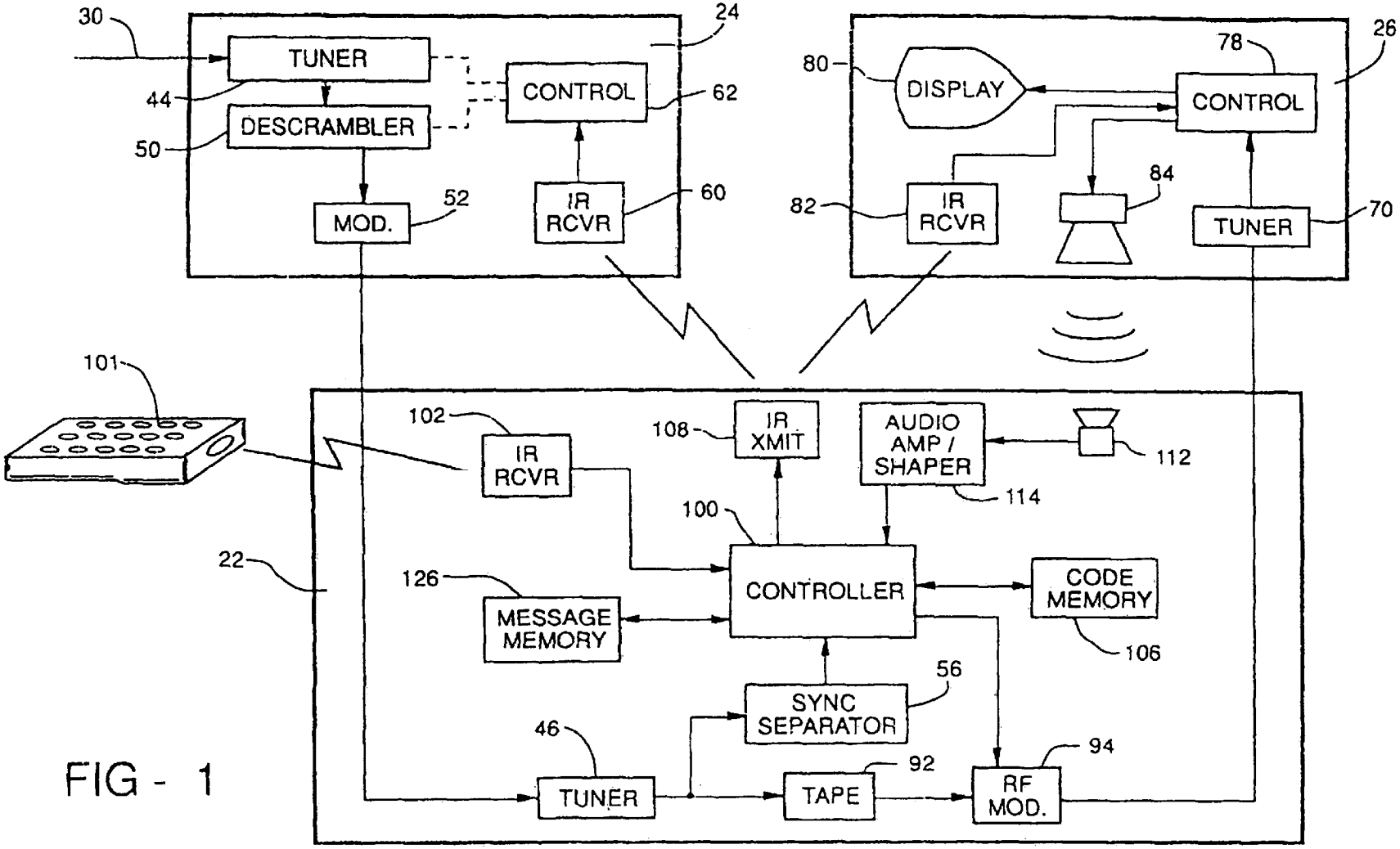
FIG. 1 is a block diagram of a preferred embodiment of the present invention incorporating a VCR connected in series with a cable box and a T.V. set.

Referring to FIG. 1, a video recorder (VCR) 22 forming a preferred embodiment of the present invention is illustrated in block-diagram form connected to receive the R.F. output of a typical cable tuner/descrambler or "cable box" 24 and to provide an R.F. output to a television receiver (T.V.) 26. All units are preferably remotely controllable via infrared signals. A multi-program signal source, such as that provided over CATV cable 30, is connected to the cable box 24.

This arrangement for interconnection between a cable box, VCR and T.V. receiver is one of several possible arrangements. It has the virtue of simplicity, but does not allow the user to view one channel while recording another channel. Other arrangements are possible.

The cable box 24 contains a tuner 44, which feeds a descrambler 50, operative to decipher premium or "pay" channels. The output of the descrambler 50 is fed to a modulator 52 which modulates the video signal derived by tuner 44 and reconstructed by descrambler 50 onto an unused VHF channel, typically channel 3. The modulated signal from the cable box 24 is provided to the VCR 22.

Control signals for the cable box 24 are received by an infrared (IR) receiver 60. A hand-held remote-control transmitter (not shown) is ordinarily used by an operator to transmit the codes. The output of IR receiver 60 is interfaced to a cable box control unit 62, which typically takes the form of a programmed micro-processor. In response to control codes received by IR receiver 60, control unit 62 directs overall cable box operations, including energization and deenergization and causing the tuner 44 to tune to a specified channel.

The output signal from VCR 22 is delivered to T.V. 26. The input signal V.C.R. is fed to a tuner 70, which interfaces to a control unit 78, such as a programmed microprocessor, which in turn interfaces to a display 80, typically a cathode-ray-tube (CRT). Remotely transmitted control codes for the T.V. receiver 26 are picked up by an infrared receiver 82, which feeds control signals to control unit 78. The audio portion of the tuned channel is delivered to the user by a loud speaker 84, also interfaced to controller 78.

The output of cable box 24 feeds a multi-channel tuner 46 within the VCR 22, which demodulates the incoming RF signal to a video signal for presentation to a video record/playback unit 92, typically a cassette tape recorder/player, though any form of video storage/retrieval mechanism may alternatively be utilized. The output of record/playback unit 92 is delivered to an RF modulator 94, which modulates the video signal onto a typically unused RF channel such as channel 3.

The demodulated video output of timer 46 is also routed to a sync separator 56, which extracts the vertical synchronization signal from the video signal and provides it to a central controller 100, preferably a programmed microprocessor. Central controller 100 also receives operator commands generated by a remote control hand-held transmitter 101 through an I.R. receiver 102 which interfaces to and/or directs the operation of various functional units within the VCR, including record/playback unit 92, an audio detector/amplifier 114 and an infrared remote-control transmitter 108 used to energize and tune the cable box 24 and T.V. 26. Control codes associated with the cable box and T.V. are stored in memory 106, which also interfaces to controller 100.

Figure 2:
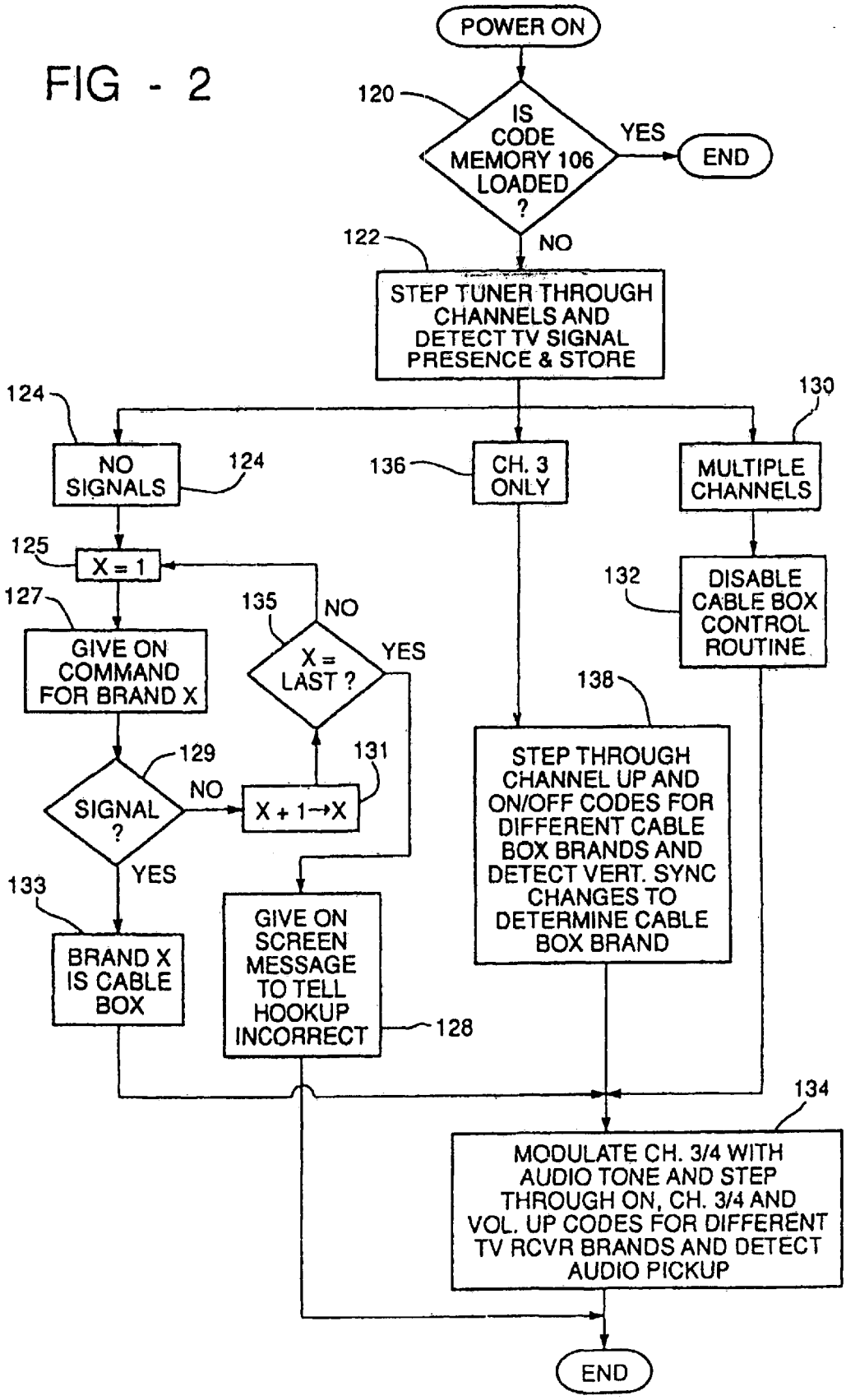
FIG. 2 is a flow chart used to illustrate how the VCR of the system of FIG. 1 ascertains the control codes of the related cable tuner/descrambler.

FIG. 2 is a flow chart illustrating the steps of the initialization routine which the controller 100 of the VCR 22 uses to ascertain the control codes of a related piece of equipment, in this case, the cable, tuner/descrambler 24, for storage in memory 106 and subsequent usage. This routine is followed each time the VCR is energized.

The first step is to determine if code memory 106 is loaded, as indicated at box 120. If the code memory is loaded, indicating that the initialization routine has previously been performed, and there has been no power outage which causes a loss of memory, the routine ends. If the code memory 106 is not loaded, the controller 100 then undergoes a routine to determine the nature of the signal source being fed to the tuner 46. This routine, indicated at block 122, involves stepping the tuner 46 of the V.C.R. 22 through each of the channels and analyzing the resulting sync signals, if any, by using the sync separator 56, to determine whether a T.V. channel is present on the channel being tuned. The sync signals can be analyzed in a variety of ways, but preferably the vertical sync signal is stripped and the time until the occurrence of the next vertical sync signal is measured. Sync signals are 16.6 milliseconds apart, and the presence of repetitive vertical sync signals with the appropriate delay indicates the presence of a tuned channel.

During this routine the controller 100 stores the identities of those channels which contain T.V. signals. If no signal has been found by this routine, as indicated by box 124, the system must then determine whether it is connected to the output of a cable box which is deenergized. To make this determination a variable "X" is first set to the value one, as indicated in block 125. "X" refers to the designator for each of a list of cable box brands. The code memory 106 contains a read only memory section storing the remote control codes for the popular cable box brands, such as General Instrument, Scientific Atlantic, Pioneer, etc. Going to box 127, the controller 100 causes the infrared transmitter 108 to transmit an "On" or energization control code for the first brand of cable box in the list. Controller 100 then analyzes the output of the sync separator 56 to determine if a video signal is now present in the input to the tuner 56. If no signal is present, the value of X in box 125 is incremented by one, as indicated in block 131, and the "On" control code for the next brand of cable box in the list is transmitter transmitted by block 127.

Figure 3:
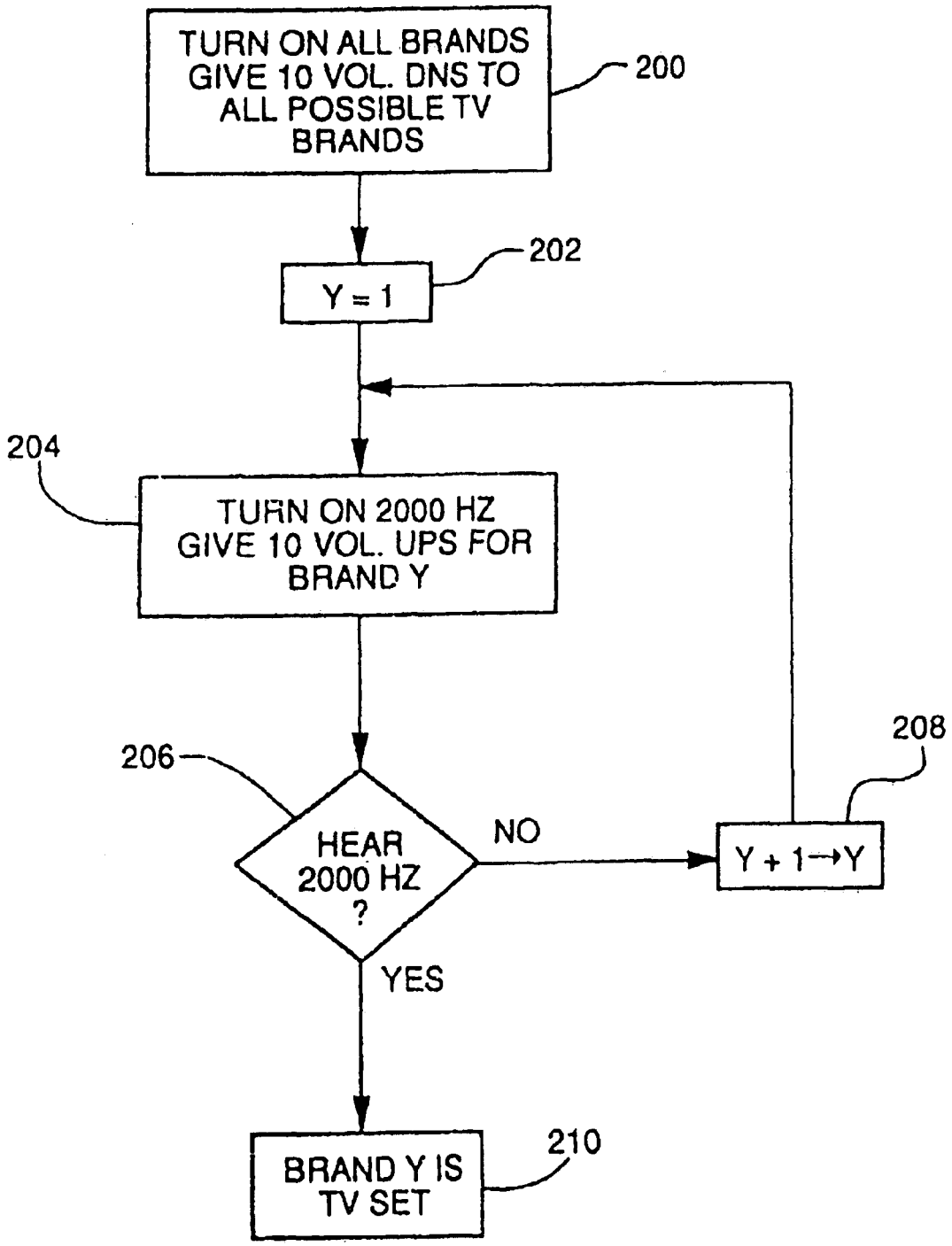
FIG. 3 is a flow chart illustrating a subroutine of the chart of FIG. 2.

This routine is continued until a video signal is detected, in which case the box 133 causes storage in a non-volatile section of the code memory 106, of a code signifying the identity of the detected cable brand and the routine proceeds to block 134, which will be subsequently described. Alternatively, if the list of cable brand codes is exhausted, without the recognition of any video signal, the block 135 causes the controller 100 to use a signal from a memory 126 to cause the generation of a message on channel 3, for display by the receiver 26, indicating that no signal source is connected to the V.C.R., and the initialization routine is ended. If the routine of box 122 determines that there are multiple channels being provided to the tuner 46, this indicates that the V.C.R. 22 is connected to a multi-channel signal source rather than to a cable box. Block 130, detecting this condition, stores a marker signal in the controller 100 which disables the subsequent cable box control routine during later use of the system. This is indicated by box 132. The system then goes into a routine to determine the control codes for the associated television memory receiver or monitor 26, indicated in box 134. The code 106 contains a read only memory storing the remote control codes for all brands of T.V. receivers. Each brand has its own unique set of control codes. Box 134 determines the brand of the associated T.V. receiver 26 and thus its control codes in the manner illustrated in detail in FIG. 3 which is a detailed version of box 134. In block 200, the controller 100 first sequentially transmits the "On" or energization codes for all brands of T.V.'s stored in the code memory 106. It then generates infrared control codes consisting of a sequence of 10 "volume down" pulses for each of the T.V. brands stored in memory 106. This routine ensures that the associated T.V. is energized and its volume setting is at a very low level. Next, a value "Y", identifying a particular brand of T.V. receiver as stored in the memory 106, is set to a value of 1 in box 202. Next, as indicated in box 204, a 2000 hertz audio signal is modulated at 94 and provided to the tuner 70 of the T.V. receiver 26. Then the controller 100 causes the transmitter 108 to transmit codes selecting channel 3, and a series of ten "volume up" control codes for T.V. receiver brand Y. During this process, the controller 100 analyzes the output of the microphone 112, as amplified and shaped by box 114, to detect a 2000 hertz audio signal. If the signal is detected during the generation of the volume up codes for a brand Y, as indicated in block 206, block 210 recognizes the associated T.V. receiver as a brand Y, and this information is stored in the code memory 106. If no 2000 hertz audio signal is detected by the microphone 112, the value of Y in box 202 is incremented by one as signified by box 208, and the routine is repeated. The identity of the T.V. brand is stored in non-volatile code memory 106. Non-volatile memory may constitute flash memory or the like or volatile memory backed up by a battery.

In the event that routine 122 detects only a single T.V. signal as the tuner 46 is stepping through the various channels, that is indicative of the fact that a cable box or satellite receiver tuner are providing signals to the tuner 46, as indicated by box 136. In that event, the controller 100 continues with the routine indicated in box 138 to determine the brand of cable box or satellite receiver. Block 138 operates in a routine similar to box 125, 127, 129, 131 and 135. In that routine, the controller 100 chooses the infrared transmitter 108 to transmit "channel up" and then "on" codes for different cable brands. During this routine the controller detects the vertical sync signals provided by the tuner 46 and the sync separator 56 to detect a shift in the timing between vertical sync signals and synchronism with the "channel up" signal. While the timing between consecutive vertical sync signals will be constant for a given channel, the sync signals for any one channel will inherently be out phased with the sync signals for any other channel, so that when the appropriate channel up code is sent for the cable box in this system there will be a phase shift in the vertical sync signals. When this shift is detected, the system has determined the cable box (or satellite tuner) brand and sends appropriate control signals to the code memory 106. The controller then shifts to the routine of box 134 to determine the brand of the T.V. receiver.

At this point the system has determined the nature of the RF input of the tuner 46, has identified the brand of cable box 24 and thus its control codes if a cable box provides input to the tuner 46, and has determined the control codes of the associated T.V. receiver 26. The system is now ready for normal operation using the single remote control transmitter 101 to control the associated cable box 24, and the T.V. receiver 26 as well as the V.C.R. 22. The controller 100 is programmed to contain routines for transmitting appropriate control codes received from the remote transmitter 101 to the cable box and the T.V.

Having thus described my invention I claim:

[1. A T.V. module adapted for use in conjunction with a remotely controllable associated unit, comprising:

a remote-control signal transmitter adapted to transmit signals representative of control codes to the associated unit;

means adapted to analyze the operation of said associated unit in response to said control codes;

a memory operative to store remote-control codes; and an electronic controller means operative to perform the following functions;

cause said remote-control signal transmitter to transmit test control signals to said associated unit, cause said means adapted to analyze the operation of said associated unit to determine control codes related to the associated unit in response to said test control codes, and cause the control codes determined to be related to the associated unit to be stored in said memory.]

[2. The invention of claim 1 in which the T.V. module is a video recorder.]

[3. The T.V. module of claim 1 wherein the associated unit is a cable tuner/descrambler.]

[4. The T.V. module of claim 1 wherein the associated unit is a satellite receiver.]

[5. The T.V. module of claim 1 wherein the associated unit is a video recorder.]

[6. The T.V. module of claim 1, further including means adapted to receive an output signal from the associated unit, said controller being operative to analyze the output signal in order to determine the operation of the associated unit in response to said test control-code signals.]

[7. The T.V. module of claim 6 wherein said output signal is a video signal.]

[8. The T.V. module of claim 7 wherein said controller is operative to analyze the synchronization of said video signal.]

[9. The T.V. module of claim 1, further comprising a connected T.V. receiver, means to receive an output signal from the receiver, wherein the controller is operative to cause the transmitter to transmit test control-code signals to the receiver; analyze the resulting operation of the receiver in order to determine control codes for the receiver; and store the control codes for the receiver in said memory.]

[10. The T.V. module of claim 9 wherein said controller is further connected to an audio sensor operative to receive an acoustic signal from said receiver, and to detect a variation in said acoustic signal.]

11. In a T.V. module [adapted] for use [in conjunction] with a remotely controllable associated unit, the T.V. module including a remote-control signal transmitter [adapted] *operative* to transmit control signals to the associated unit; [means] *a processor* for analyzing the operation of the associated unit; and a memory [adapted to store] *for storing* remote-control codes, [the] *a* method of determining control codes for the associated unit[,] comprising the *following* steps [of]:

transmitting test control codes to the associated unit *each time the T.V. module is energized*;

analyzing*, with the processor and* without operator intervention, the resulting operation of the associated unit in order to determine its control codes; and storing the control codes in a memory.

12. The method of claim 11 wherein the step of electronically analyzing the resulting operation of the associated unit in order to determine its control codes includes the step of analyzing an output signal from the associated unit.

13. The method of claim 12 wherein the step of analyzing said output signal includes the step of analyzing a video signal.

14. The method of claim 13 wherein the step of analyzing a video signal includes the step of analyzing the synchronization of said video signal.

15. The method of claim 14 wherein the step of analyzing said output signal includes the step of analyzing an acoustic signal.

* * * * *